(12) United States Patent
Aksit et al.

(10) Patent No.: US 6,537,023 B1
(45) Date of Patent: Mar. 25, 2003

(54) SUPPLEMENTAL SEAL FOR THE CHORDAL HINGE SEAL IN A GAS TURBINE

(75) Inventors: Mahmut Faruk Aksit, Istanbul (TR); Ahmad Safi, Troy, NY (US); Abdul-Azeez Mohammed-Fakir, Schenectady, NY (US); Gilbert Joseph Dean, Fountain Inn, SC (US); Thomas Paul Martin, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/028,926

(22) Filed: Dec. 28, 2001

(51) Int. Cl.[7] .................................................. F01D 9/04
(52) U.S. Cl. .................. 415/191; 415/209.2; 415/209.3
(58) Field of Search ............................... 415/191, 209.2, 415/209.3, 139

(56) References Cited

U.S. PATENT DOCUMENTS

| | | | |
|---|---|---|---|
| 4,815,933 A | * 3/1989 | Hansel et al. | 415/189 |
| 5,149,250 A | * 9/1992 | Plemmons et al. | 415/209.3 |
| 5,271,714 A | * 12/1993 | Shepherd et al. | 415/209.2 |
| 6,095,750 A | * 8/2000 | Ross et al. | 415/189 |

* cited by examiner

Primary Examiner—Ninh Nguyen
(74) Attorney, Agent, or Firm—Nixon & Vanderhye

(57) ABSTRACT

In a gas turbine having a chordal hinge seal between an inner rail of each nozzle segment and an annular axially facing sealing surface of a nozzle support ring, a supplemental seal is disposed between the support ring and inner rail of the nozzle segment on a high pressure side of the chordal hinge seal. The supplemental seal includes a sheet metal seal supported by a bracket secured to the back side and radial inner surfaces of the inner rail. The sheet metal seal has a flexible margin which is preloaded and bears against the annular sealing surface of the nozzle support ring. The bracket is bolted or welded to the inner rail with the sheet metal seal therebetween inhibiting or precluding leakage past the back side of the supplemental seal.

15 Claims, 7 Drawing Sheets

SUPPLEMENTAL SEAL FOR THE CHORDAL HINGE SEAL IN A GAS TURBINE

BACKGROUND OF THE INVENTION

The present invention relates to seals in a gas turbine for supplementing the chordal hinge seals between turbine nozzles and a turbine nozzle support ring and particularly relates to supplementary seals for substantially minimizing or eliminating leakage losses past the chordal hinge seals.

In a gas turbine, hot gases of combustion flow from combustors through first-stage nozzles and buckets and through the nozzles and buckets of follow-on turbine stages. The first-stage nozzles typically include an annular array or assemblage of cast nozzle segments each containing one or more nozzle stator vanes per segment. Each first-stage nozzle segment also includes inner and outer band portions spaced radially from one another. Upon assembly of the nozzle segments, the stator vanes are circumferentially spaced from one another to form an annular array thereof between annular inner and outer bands. A nozzle retaining ring coupled to the outer band of the first-stage nozzles supports the first-stage nozzles in the gas flow path of the turbine. An annular nozzle support ring, preferably split at a horizontal midline, is engaged by the inner band and supports the first-stage nozzles against axial movement.

In an exemplary arrangement, eighteen cast segments are provided with two vanes per segment. The annular array of segments are sealed one to the other along adjoining circumferential edges by side seals. The side seals seal between a high pressure region radially inwardly of the inner band, i.e., compressor discharge air at high pressure, and the hot gases of combustion in the hot gas flow path which are at a lower pressure.

Chordal hinge seals are used to seal between the inner band of the first-stage nozzles and an axially facing surface of the nozzle support ring. Each chordal hinge seal includes an axial projection which extends linearly along a chordline of the inner band portion of each nozzle segment. Particularly, the chordal hinge seal extends along an inner rail of each segment and which rail lies radially inwardly of the inner band portion. The chordal hinge seal projection lies in sealing engagement with the axially opposite facing sealing surface of the nozzle support ring.

During operation and/or repair of the first-stage nozzle, it has been found that warpage can leave gaps between the chordal hinge seals and the sealing surface of the nozzle support ring. These gaps enable leakage past the chordal hinge seals from the high pressure area radially within the annular inner band into the hot gas flow path. That is, the chordal hinge seals are inadequate to prevent leakage flow as the chordal hinge seal projections lose contact with the sealing surface of the nozzle support ring. Consequently, there is a need for a supplemental seal at the interface of the first-stage nozzles and nozzle support ring to minimize or eliminate the leakage flow past the chordal hinge seals.

BRIEF DESCRIPTION OF THE INVENTION

In accordance with a preferred embodiment of the present invention, there is provided a supplemental seal between the first-stage nozzles and the nozzle support ring which eliminates or minimizes leakage past the chordal hinge seals and which is readily and easily installed. In a preferred embodiment, the supplemental seal includes a flexible sheet metal seal secured to the inner rail and having a margin preloaded for sealing engagement against a first surface of the nozzle support ring. Preferably, the sheet metal seal is bent or folded in a generally L-shaped configuration with the two leg portions of the sheet metal seal extending along a side of the inner rail remote from the chordal hinge seal and along a radial inner face of the inner rail, respectively. The sheet metal seal extends the full chordal length of the inner rail. At the juncture of the leg portions, the sheet metal seal is relieved to provide a bead directed away from the corner edge of the inner rail. The margin of the sheet metal seal is preloaded and extends axially and then turns in a generally radially inward direction to seal against the first surface of the nozzle support ring.

To retain and clamp the sheet metal seal segment onto the inner rail, a complementary-shaped bracket overlies the seal and inhibits or prevents leakage flow between the sheet metal seal and the inner rail. The bracket is preferably either welded to the inner rail along its radial outer edge and along ends of the bracket and the inner rail or the bracket may be bolted to the inner rail. In either case, the bracket supports the seal, clamps the seal against the inner rail, provides the sealing support between the seal and the inner rail and maintains the preloaded margin of the sheet metal seal in sealing engagement against the first surface of the nozzle support ring.

In a preferred embodiment according to the present invention, there is provided a turbine comprising a turbine nozzle support ring having a generally axially facing first surface, a turbine nozzle segment having at least one stator vane and a radially inwardly extending inner rail having a second surface in axial opposition to the first surface, a seal extending along the inner rail including a sheet metal segment having a flexible margin preloaded to seal against the first surface and a support bracket extending along at least a portion of one side of the seal to support the sheet metal segment along the inner rail, the support bracket being secured to the inner rail to clamp the sheet metal segment against a wall portion of the inner rail and minimize or prevent leakage between the rail and the sheet metal segment.

DETAILED DESCRIPTION OF THE INVENTION

Figure 1:
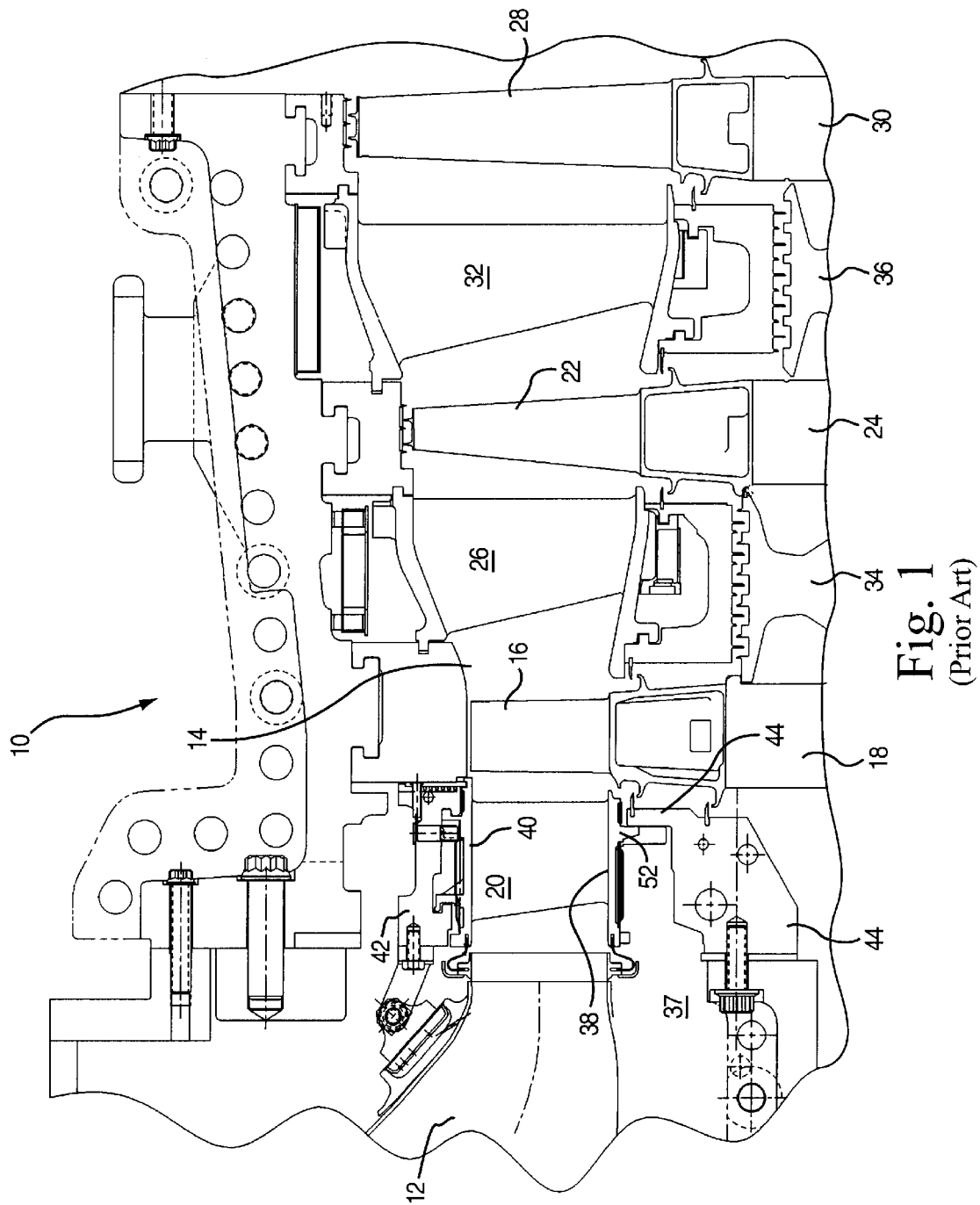
FIG. 1 is a fragmentary schematic side elevational view of a portion of a gas turbine.

Referring now to FIG. 1, there is illustrated a representative example of a turbine section of a gas turbine, generally designated 10. Turbine 10 receives hot gases of combustion from an annular array of combustors, not shown, which transmit the hot gases through a transition piece 12 for flow along an annular hot gas path 14. Turbine stages are disposed along the hot gas path 14. Each stage comprises a plurality of circumferentially spaced buckets mounted on and forming part of the turbine rotor and a plurality of circumferentially spaced stator vanes forming an annular array of nozzles. For example, the first stage includes a plurality of circumferentially-spaced buckets 16 mounted on a first-stage rotor wheel 18 and a plurality of circumferentially-spaced stator vanes 20. Similarly, the second stage includes a plurality of buckets 22 mounted on a rotor wheel 24 and a plurality of circumferentially-spaced stator vanes 26. Additional stages may be provided, for example, a third stage comprised of a plurality of circumferentially-spaced buckets 28 mounted on a third-stage rotor wheel 30 and a plurality of circumferentially-spaced stator vanes 32. It will be appreciated that the stator vanes 20, 26 and 32 are mounted on and fixed to a turbine casing, while the buckets 16, 22 and 28 and wheels 18, 24 and 30 form part of the turbine rotor. Between the rotor wheels are spacers 34 and 36 which also form part of the turbine rotor. It will be appreciated that compressor discharge air is located in a region 37 disposed radially inwardly of the first stage and that such air in region 37 is at a higher pressure than the pressure of the hot gases flowing along the hot gas path 14.

Figure 2:
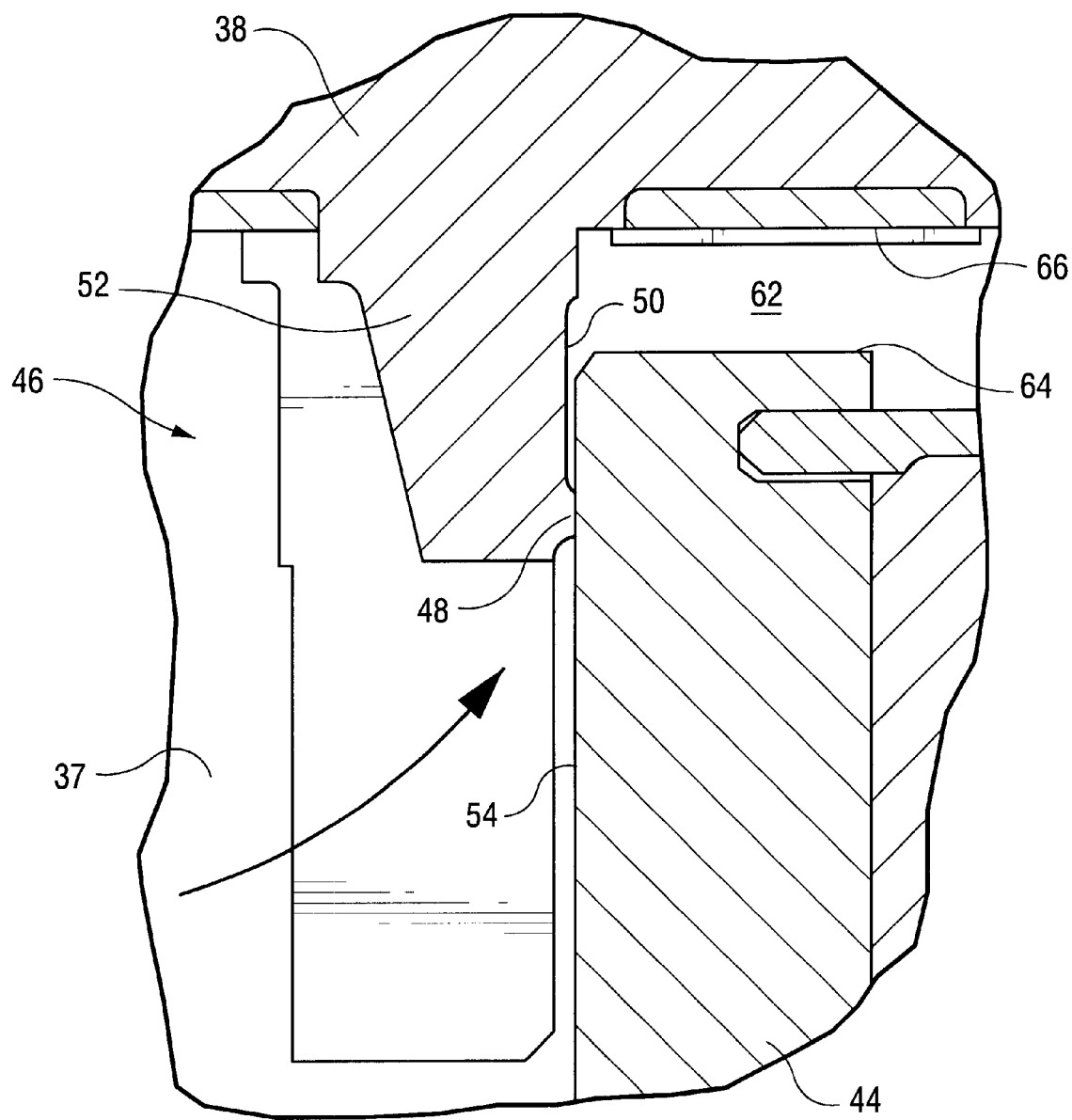
FIG. 2 is an enlarged fragmentary cross-sectional view illustrating a conventional chordal seal hinge.
Figure 3:
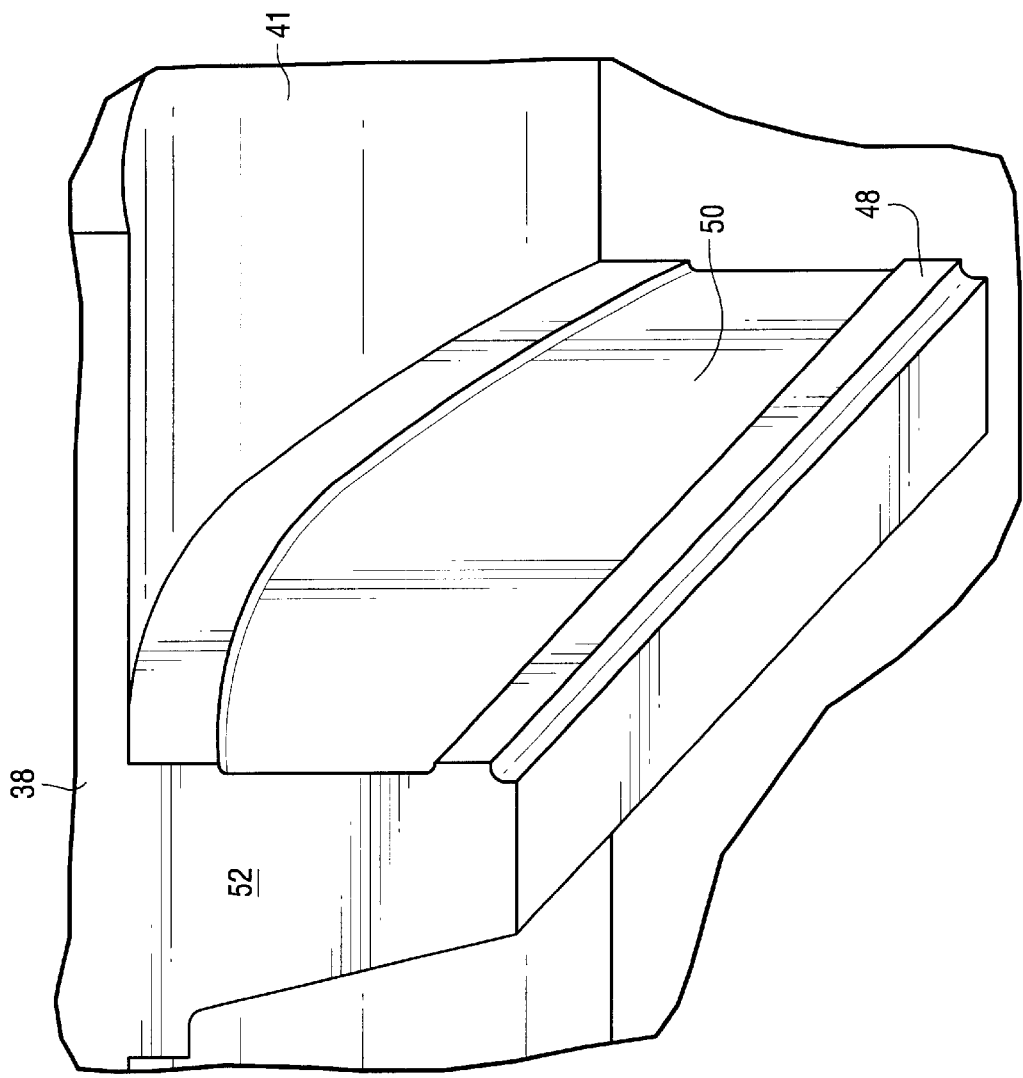
FIG. 3 is a fragmentary perspective view illustrating a portion of a conventional chordal hinge seal along an inner rail of a nozzle segment.
Figure 4:
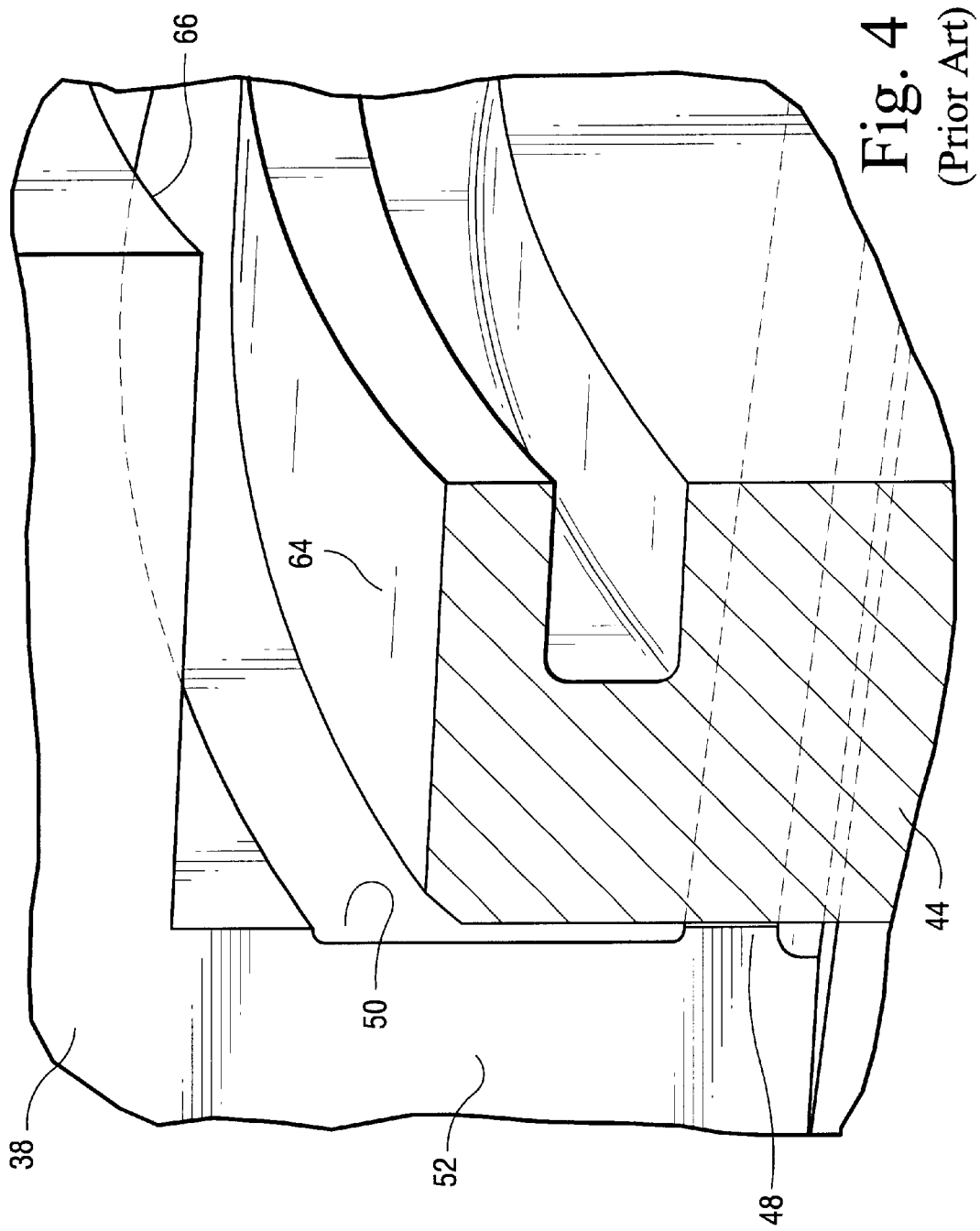
FIG. 4 is a fragmentary perspective view with parts in cross-section illustrating the conventional chordal hinge seal in sealing engagement with a nozzle support ring of the gas turbine.

Referring to the first stage of the turbine, the stator vanes 20 forming the first-stage nozzles are disposed between inner and outer bands 38 and 40, respectively, supported from the turbine casing. As noted above, the nozzles of the first stage are formed of a plurality of nozzle segments 41 (FIG. 3) each mounting one, preferably two, stator vanes extending between inner and outer band portions and arranged in an annular array of segments. A nozzle retaining ring 42 connected to the turbine casing is coupled to the outer band and secures the first-stage nozzle. A nozzle support ring 44 radially inwardly of the inner band 38 of the first-stage nozzles engages the inner band 38. Particularly, the interface between the inner band 38 and the nozzle support ring 44 includes an inner rail 52 (FIG. 2). The inner rail 52 includes a chord-wise, linearly extending axial projection 48, generally and collectively hereinafter referred to as a chordal hinge seal 46. Projection 48 extends along an axial facing surface 50 of the inner rail 52 which forms an integral part of each nozzle segment and specifically the inner band 38. The projection 48 engages a first annular surface 54 of the nozzle support ring 44. It will be appreciated that high pressure compressor discharge air lies in the region 37 and lower pressure hot gases flowing in the hot gas path 14 lie on the opposite side of the seal 46. The chordal hinge seal 46 is thus intended to seal against leakage from the high pressure region 37 into the lower pressure region of the hot gas path 14.

Figure 5:
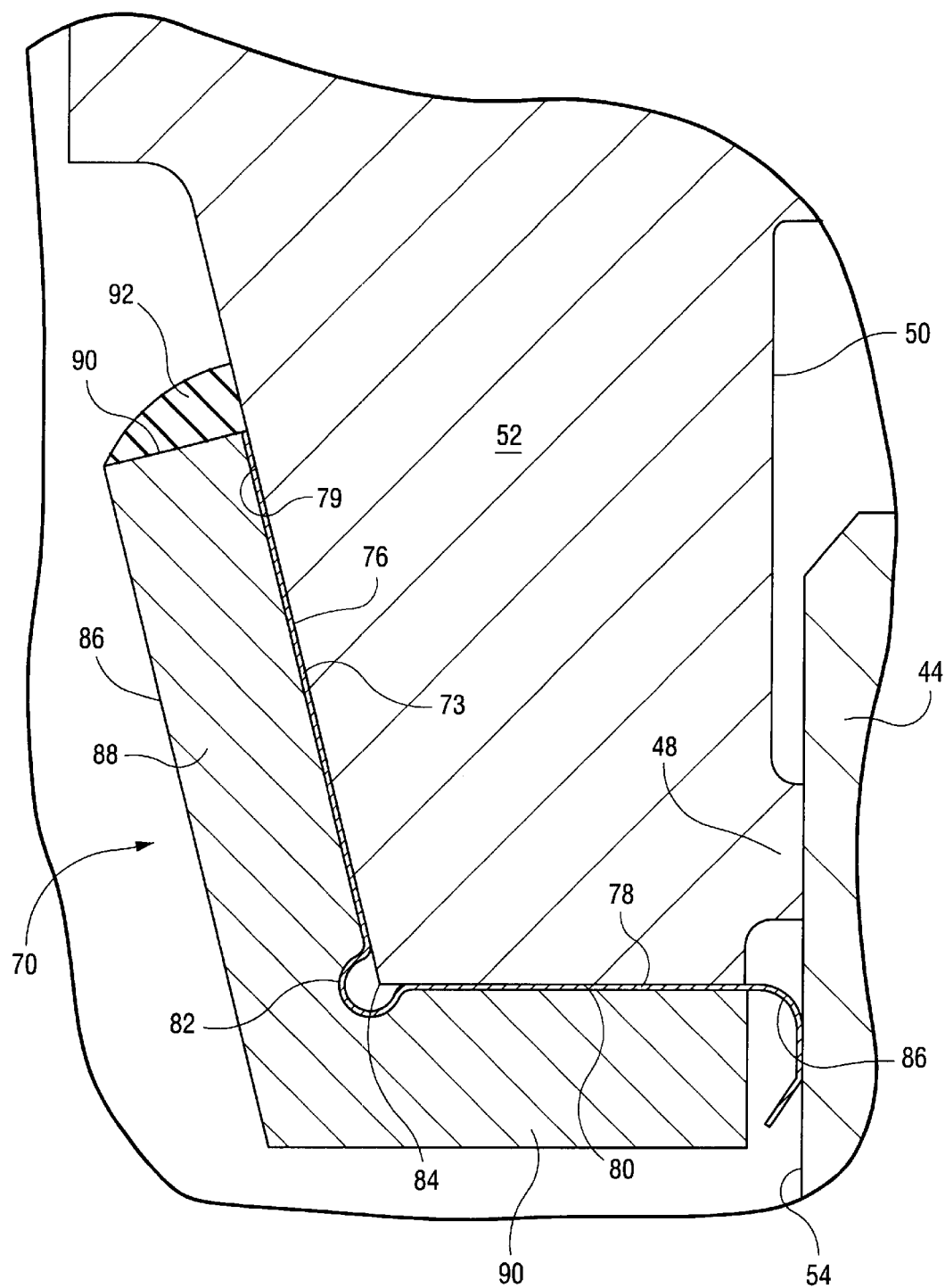
FIG. 5 is a fragmentary enlarged cross-sectional view illustrating a supplemental seal according to a preferred embodiment of the present invention.
Figure 6:
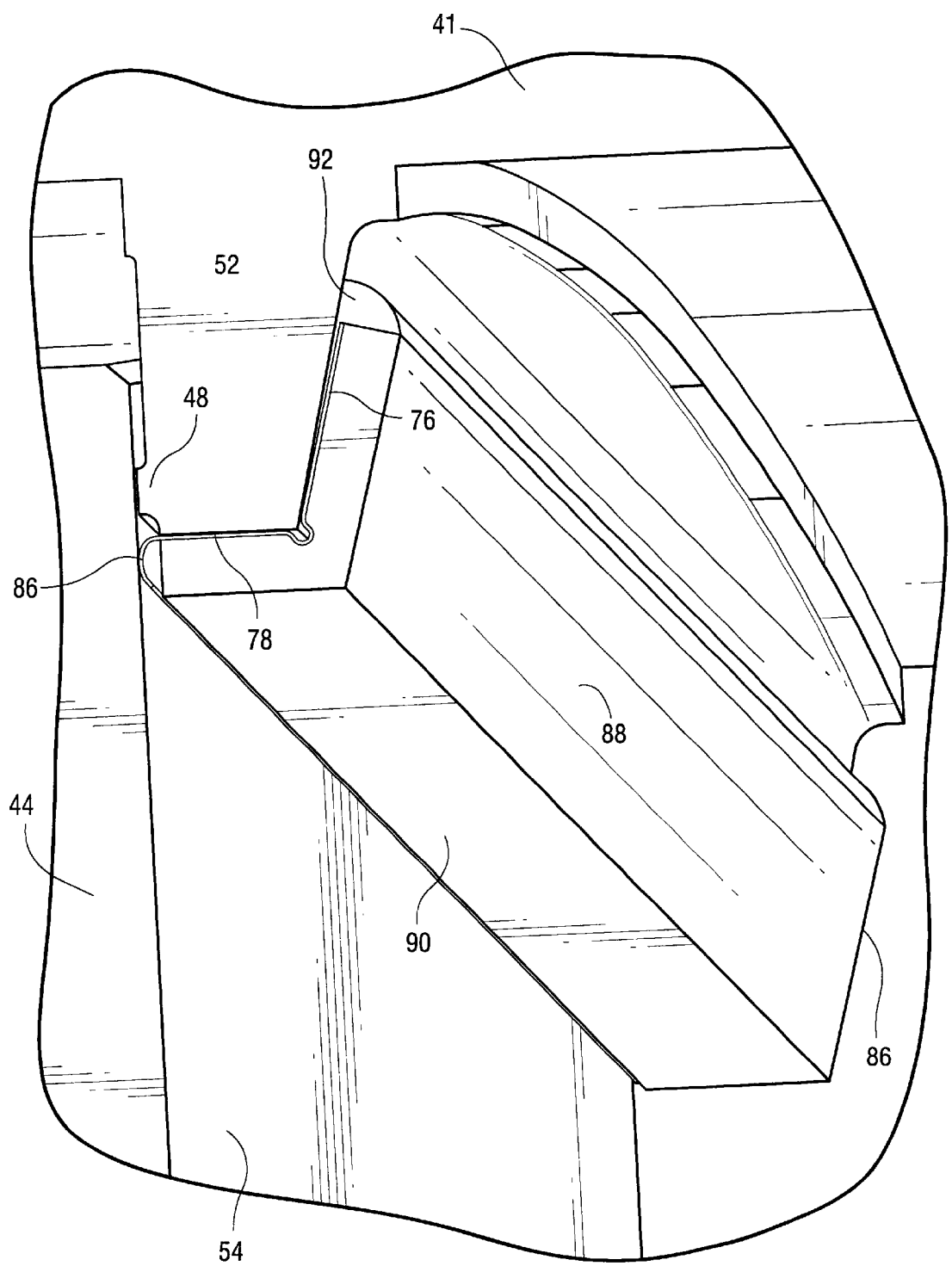
FIG. 6 is a fragmentary perspective view of the chordal hinge seal and the supplemental seal as viewed from the back surface of the inner rail.

As noted previously, however, when operating the turbine, component parts of the nozzles and nozzle support ring will tend to form leakage gaps between the projections 48 and the surface 54 of the nozzle support ring 44 whereby leakage flow may occur from the high pressure region to the low pressure region. In order to minimize or prevent leakage flow into the hot gas path 14, and in accordance with a preferred embodiment of the present invention, there is provided a supplemental seal for sealing between the first-stage nozzles and the nozzle support ring 44. The supplemental seal, generally designated 70 (FIG. 5), is provided in seal segments 73 extending in a chord-wise direction corresponding in length to the length of the inner rail 52 in the chord-wise direction. Each seal segment is formed of a thin, flexible sheet metal seal having a generally L-shaped configuration with generally radial and axial extending leg portions 76 and 78, respectively. The leg portions 76 and 78 are shaped correspondingly to the shape of the side 79 of the inner rail 52 remote from surface 50 and the radial inner surface 80 of the inner rail. Between the leg portions 76 and 78 is a bead 82 forming part of the sheet metal segment and which is directed away from the linearly extending corner 84 at the juncture of the side and inner face of the inner rail 52. This prevents wear and potential damage to the juncture of the leg portions of the seal segment.

The sheet metal seal segment 73 includes a distal marginal portion 86 which is preloaded to extend axially and radially inwardly to engage the sealing surface 54 of the nozzle support ring 44.

Figure 7:
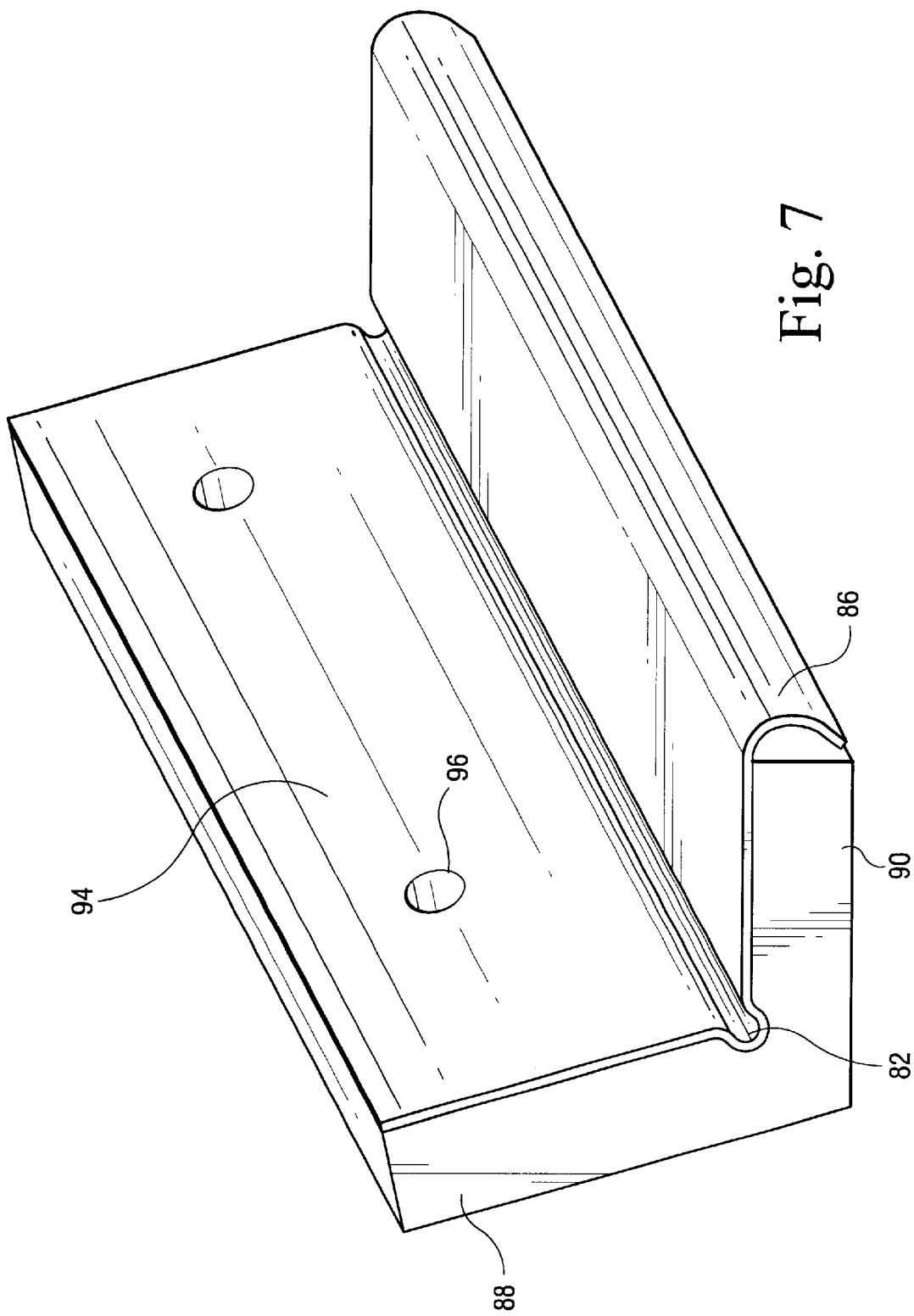
FIG. 7 is a perspective view of the supplemental seal and its support bracket.

To support the seal in position as described above, a support bracket 88 having a generally L-shaped configuration corresponding to the configuration of the sheet metal segment is provided. The bracket 86 includes corresponding leg portions 88 and 90 for bearing against the sheet metal seal and maintaining the sheet metal seal in clamped sealing engagement against the inner rail 52. To secure the bracket and the sheet metal seal to the inner rail, the bracket 86 may be welded to the inner rail along the radial outer edge 90 thereof as indicated by the weld bead 92 and also along the opposite ends of the inner rail 52. Alternatively, the bracket 86, together with the sheet metal segment 73, may be bolted to the inner rail 52, preferably along the side thereof remote from surface 52. The bolt holes and portions of the bolts are indicated in FIG. 7 at 94 and 96, respectively. The bolt heads, of course, appear along the accessible back side of the leg portion 88 of bracket 86.

The supplemental seal is maintained in sealing engagement against surface 54 by the preload bias of the marginal portion 86 against the surface 54. Additionally, during turbine operation, the high pressure from the high pressure region 37 of the turbine biases the flexible marginal portion 86 against the sealing surface 54 of the nozzle support ring. The metal-to-metal contact along the sealing surfaces assures effective sealing. The sheet metal seal may have a thickness on the order of 0.006 inches. It will be appreciated that with the welded or bolted-on arrangement, the supplemental seal may be readily and easily installed onto the inner rail. Moreover, by overlapping sheet metal parts at the edge of the seal segment, i.e., extending the sheet metal seal beyond the edges of the inner rail, the gaps between adjacent nozzle segments may be sealed. It will be appreciated that any warpage or deformation of the parts of the turbine, i.e., the inner rail and nozzle support ring, could open a gap between the chordal hinge seal projection 48 and the sealing surface 54. The bias and high pressure against the margin 86 of the supplemental seal maintains a seal between the nozzle segments and the nozzle support ring. Also, with the sheet metal seal clamped to the surfaces of the inner rail 52, leakage from the back side of the seal is precluded.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine comprising:

a turbine nozzle support ring having a generally axially facing first surface;

a turbine nozzle segment having at least one stator vane and a radially inwardly extending inner rail having a second surface in axial opposition to said first surface;

a seal extending along said inner rail including a sheet metal segment having a flexible margin preloaded to seal against said first surface; and a support bracket extending along at least a portion of one side of said seal to support said sheet metal segment along said inner rail, said support bracket being secured to said inner rail to clamp the sheet metal segment against a wall portion of said inner rail and minimize or prevent leakage between said rail and said sheet metal segment.

2. A turbine according to claim 1 wherein said seal extends linearly in a chord-wise direction along said inner rail, said sheet metal segment extending along a side of said inner rail remote from said second surface.

3. A turbine according to claim 2 wherein said sheet metal segment extends along a radial inner face of said inner rail.

4. A turbine according to claim 1 wherein said bracket is welded to said inner rail with said sheet metal segment clamped therebetween.

5. A turbine according to claim 1 wherein said bracket is bolted to said inner rail with said sheet metal segment clamped therebetween.

6. A turbine according to claim 1 wherein said seal extends linearly in a chord-wise direction along said inner rail, said sheet metal segment extending along a side of said inner rail remote from said second surface and along a radial inner face of said inner rail, said sheet metal segment being relieved at a juncture between said remote side and said radial inner face of said inner rail.

7. A turbine according to claim 1 wherein said margin extends axially and radially inwardly to sealingly engage said first surface.

8. A turbine according to claim 1 wherein said seal extends linearly in a chord-wise direction along said inner rail, said sheet metal segment extending along a side of said inner rail remote from said second surface, said sheet metal segment extending along a radial inner face of said inner rail, said support bracket extending along said remote side and said inner face of said inner rail.

9. A turbine according to claim 8 wherein said bracket is welded to said inner rail along a radial outer edge of said bracket and along opposite ends of said bracket and said inner rail.

10. A turbine according to claim 8 wherein said bracket is bolted to said inner rail along said remote side of said inner rail.

11. A turbine according to claim 9 wherein said seal extends linearly in a chord-wise direction along said inner rail, said sheet metal segment extending along a side of said inner rail remote from said second surface and along a radial inner face of said inner rail, said sheet metal segment being relieved at a juncture between said remote side and said radial inner face of said inner rail.

12. A turbine according to claim 1 wherein said inner rail has a projection extending axially from said inner rail for sealing engagement against said first surface and forming a second seal therewith.

13. A turbine according to claim 12 wherein said projection extends linearly along said inner rail.

14. A turbine according to claim 13 wherein said sealing engagement between said projection and said first surface lies on a low pressure side of the first-mentioned seal.

15. A turbine according to claim 14 wherein the first seal extends linearly in a chord-wise direction about the axis of the turbine.

* * * * *